US012704997B2

(12) United States Patent
Lee et al.

(10) Patent No.: US 12,704,997 B2
(45) Date of Patent: Aug. 11, 2026

(54) APPARATUS FOR CONTROLLING VEHICLE AND METHOD THEREOF

(71) Applicants: Hyundai Motor Company, Seoul (KR); Kia Corporation, Seoul (KR); HYUNDAI AUTOEVER Corp., Seoul (KR)

(72) Inventors: Wang Seok Lee, Hwaseong-Si (KR); Hyung Chul Kim, Hwaseong-Si (KR); Doo Hyun Moon, Seoul (KR); Young Jin Roh, Seongnam-Si (KR)

(73) Assignees: Hyundai Motor Company, Seoul (KR); Kia Corporation, Seoul (KR); HYUNDAI AUTOEVER Corp., Seoul (KR)

( * ) Notice: Subject to any disclaimer, the term of this patent is extended or adjusted under 35 U.S.C. 154(b) by 0 days.

(21) Appl. No.: 18/948,826

(22) Filed: Nov. 15, 2024

(65) Prior Publication Data

US 2025/0348244 A1 Nov. 13, 2025

(30) Foreign Application Priority Data

May 7, 2024 (KR) ........................ 10-2024-0059944

(51) Int. Cl.

| | |
|---|---|
| ***G06F 3/06*** | (2006.01) |
| ***B60R 16/023*** | (2006.01) |
| *B60W 50/06* | (2006.01) |

(52) U.S. Cl.
CPC ........ *G06F 3/0656* (2013.01); *B60R 16/0231* (2013.01); *G06F 3/0604* (2013.01); *G06F 3/0673* (2013.01); *B60W 50/06* (2013.01)

(58) Field of Classification Search
CPC .... G06F 3/0656; G06F 3/0604; G06F 3/0673; B60R 16/0231; B60W 50/06
See application file for complete search history.

(56) References Cited

U.S. PATENT DOCUMENTS

| | | | | |
|---|---|---|---|---|
| 9,235,456 | B2 * | 1/2016 | Stellwag | G05B 19/0426 |
| 10,860,397 | B1 * | 12/2020 | Silver | G06F 9/5027 |
| 2006/0085795 | A1 * | 4/2006 | Washizu | G06F 12/0223 718/100 |

* cited by examiner

*Primary Examiner* — Hosain T Alam
*Assistant Examiner* — Subir Kumar Chowdhury
(74) *Attorney, Agent, or Firm* — Banner & Witcoff, Ltd.

(57) ABSTRACT

Disclosed are an apparatus for controlling a vehicle and a method thereof. The apparatus includes a processor and a memory. The processor obtains first data based on execution of a first application, identifies a second application related to the first data based on obtaining the first data, writes the first data to a task area commonly assigned to the first application and the second application based on identifying the second application, and processes the first data by using the second application accessible to the task area after writing the first data to the task area.

20 Claims, 9 Drawing Sheets

APPARATUS FOR CONTROLLING VEHICLE AND METHOD THEREOF

CROSS-REFERENCE TO RELATED APPLICATION

The present application claims priority to Korean Patent Application No. 10-2024-0059944, filed May 7, 2024, the entire contents of which are incorporated herein by reference for all purposes.

TECHNICAL FIELD

The present disclosure relates to an apparatus for controlling a vehicle and a method thereof, and more specifically, to a technology for processing data.

BACKGROUND

A process for processing data between applications may be distinguished from a process for using data. A relatively large load may occur depending on the data size, for example, because data is moved (or copied) based on runnable to process data. By distinguishing between host internal data communication and host external data communication, a scheme of processing data may be required. In host internal data communication, it is necessary to provide an interface for reducing the time caused by data copy using a shared memory area.

SUMMARY

The following summary presents a simplified summary of certain features. The summary is not an extensive overview and is not intended to identify key or critical elements.

An aspect of the present disclosure provides an apparatus for controlling a vehicle capable of maintaining data integrity, and a method thereof.

Another aspect of the present disclosure provides an apparatus for controlling a vehicle capable of providing data communication between applications within a host, and a method thereof.

Still another aspect of the present disclosure provides an apparatus for controlling a vehicle capable of reducing data processing time by generating a memory area to be shared between applications, and a method thereof.

The technical problems to be solved by the present disclosure are not limited to the aforementioned problems, and any other technical problems not mentioned herein will be clearly understood from the following description by those skilled in the art to which the present disclosure pertains.

An apparatus may comprise: a processor; and a memory, wherein the processor is configured to: obtain, based on execution of a first application, first data; identify, based on obtaining the first data, a second application related to the first data; write, based on identifying the second application, the first data to a shared task area, of the memory, assigned to the first application and the second application; and after writing the first data to the shared task area, process the first data by using the second application accessible to the shared task area.

The processor may be configured to: based on preset information, determine whether to process the first data in the shared task area; assign the shared task area to the first application and the second application in common during the first data being processed in the shared task area; write, to the shared task area, the first data included in a first application buffer occupied by the first application; and stop copying the written first data to a second application buffer occupied by the second application.

The processor may be configured to: based on the preset information, move the first data to the second application buffer during the first data not being processed in the shared task area; and process the first data moved to the second application buffer by using the second application.

The processor may be configured to: based on whether a communication scheme corresponding to the first application and a communication scheme corresponding to the second application are same, determine whether to process the first data in the shared task area.

The preset information may comprise at least one of: information about data that is obtainable based on execution of the first application, information about the second application related to the data, or information about a communication scheme between the first application for processing the data and the second application.

The shared task area may comprise a plurality of task buffers, and wherein the processor may be configured to: write the first data to a first task buffer of the plurality of task buffers; and write, to a second task buffer of the plurality of task buffers, second data sequentially obtained based on execution of the first application while processing the first data in the first task buffer by using the second application.

The processor may be configured to: block access of the second application to the first task buffer by setting a lock on the first task buffer before writing the first data to the first task buffer; and release the lock on the first task buffer after writing the first data to the first task buffer.

The processor may be configured to write information about the second application that processed the first data to the first task buffer after the processing of the first data by the second application.

The processor may be configured to process the first data by identifying an address of the first task buffer.

The processor may be configured to identify an address of the second task buffer among the address of the first task buffer and the address of the second task buffer after writing the second data to the second task buffer.

A method performed by a computing device may comprise: obtaining, based on execution of a first application, first data; identifying, based on the obtaining the first data, a second application related to the first data; writing, based on the identifying the second application, the first data to a shared task area, of a memory, assigned to the first application and the second application; and after writing the first data to the shared task area, processing the first data by using the second application accessible to the shared task area.

The processing of the first data may comprise: based on preset information, determining whether to process the first data in the shared task area; assigning the shared task area to the first application and the second application in common during the first data being processed in the shared task area; writing, to the shared task area, the first data included in a first application buffer occupied by the first application; and stopping copying the written first data to a second application buffer occupied by the second application.

The processing of the first data may further comprise: based on the preset information, moving the first data to the second application buffer during the first data not being processed in the shared task area; and processing the first data moved to the second application buffer by using the second application.

The determining whether to process the first data may comprise: based on whether a communication scheme corresponding to the first application and a communication scheme corresponding to the second application are same, determining whether to process the first data in the shared task area.

The preset information may comprise at least one of: information about data that is obtainable based on execution of the first application, information about the second application related to the data, or information about a communication scheme between the first application for processing the data and the second application.

The shared task area may comprise a plurality of task buffers, and the processing of the first data may comprise: writing the first data to a first task buffer of the plurality of task buffers; and writing, to a second task buffer of the plurality of task buffers, second data sequentially obtained based on execution of the first application while processing the first data in the first task buffer by using the second application.

The writing of the first data to the first task buffer may comprise: blocking access of the second application to the first task buffer by setting a lock on the first task buffer before writing the first data to the first task buffer; and releasing the lock on the first task buffer after writing the first data to the first task buffer.

The writing of the first data to the first task buffer may comprise writing information about the second application that processed the first data to the first task buffer after the processing of the first data by the second application.

The processing of the first data may comprise processing the first data by identifying an address of the first task buffer.

The writing to the second task buffer may comprise identifying an address of the second task buffer among the address of the first task buffer and the address of the second task buffer after writing the second data to the second task buffer.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
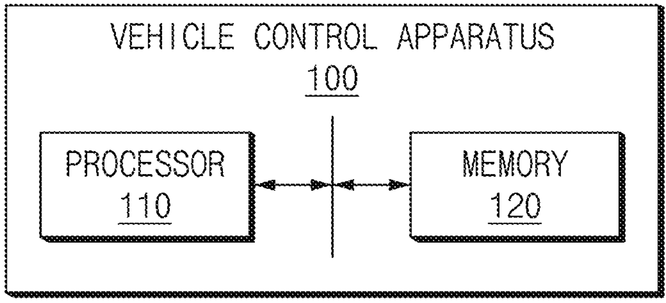
FIG. 1 shows an example block diagram showing a vehicle control apparatus according to an example of the present disclosure.

Hereinafter, some examples of the present disclosure will be described in detail with reference to the exemplary drawings. In adding the reference numerals to the components of each drawing, it should be noted that the identical or equivalent component is specified by the identical numeral even when/if they are displayed on other drawings. Further, in describing the example of the present disclosure, a detailed description of the related known configuration or function will be omitted when/if it is determined that it interferes with the understanding of the example of the present disclosure.

In addition, terms, such as first, second, A, B, (a), (b) or the like may be used herein when/if describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. According to an example, the module may be implemented in a form of an application-specific integrated circuit (ASIC). According to various examples, operations performed by the module, the program, or another component may be carried out sequentially, in parallel, or repeatedly, or one or more of the operations may be executed in a different order or omitted, or one or more other operations may be added.

Various examples as set forth herein may be implemented as software (e.g., program) including one or more instructions that are stored in a storage medium (e.g., internal memory or external memory) that is readable by a machine (e.g., an apparatus 100 for controlling a vehicle). For example, a processor (e.g., a processor 110) of the machine (e.g., the apparatus 100 for controlling a vehicle) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Hereinafter, examples of the present disclosure will be described in detail with reference to FIGS. 1 to 9.

FIG. 1 is a block diagram illustrating an example of a vehicle control apparatus according to an example of the present disclosure. Although some examples of the present disclosure describe vehicle control apparatus, aspects of the present disclosure can be applied to other apparatuses and/or devices the perform communication with other apparatuses and/or devices.

Referring to FIG. 1, the vehicle control apparatus 100 according to an example of the present disclosure may be implemented inside or outside a and some of the components included in the vehicle control apparatus 100 may be implemented inside or outside the vehicle. In this case, the vehicle control apparatus 100 may be formed integrally with internal control devices of the vehicle, or may be implemented as a separate device and connected to the control devices of the vehicle through a separate connection device. For example, the vehicle control apparatus 100 may further include components not shown in FIG. 1.

The vehicle control apparatus 100 according to an example may include at least one of the processor 110 or a memory 120. The processor 110 and the memory 120 may be electrically and/or operably coupled to each other through electronic components including a communication bus. Hereinafter, hardware being operably coupled may mean that a direct connection or an indirect connection between the hardware is established wired or wirelessly, such that second hardware is controlled by first hardware among the hardware. Although shown based on different blocks, the example is not limited thereto, and some of the hardware in FIG. 1 (e.g., at least a portion of the processor 110, the memory 120, and communication circuit (not shown)) may be included in a single integrated circuit such as a system on chip (SoC).

The processor 110 of the vehicle control apparatus 100 according to an example may include a hardware component for processing data based on one or more instructions. For example, hardware components for processing data may include an arithmetic and logic unit (ALU), a floating point unit (FPU), a field programmable gate array (FPGA), a central processing unit (CPU), a micro controller unit (MCU), and/or an application processor (AP). The number of processors 110 may be one or more. For example, the processor 110 may have the structure of a multi-core processor including dual cores, quad cores, hexa cores, or octa cores.

The memory 120 of the vehicle control apparatus 100 according to an example may include a hardware component for storing data and/or instructions input and/or output to the processor 110. For example, the memory 120 may include a volatile memory such as a random-access memory (RAM) and/or a non-volatile memory such as a read-only memory (ROM). For example, the volatile memory may include at least one of a dynamic RAM (DRAM), a static RAM (SRAM), a cache RAM, and a pseudo SRAM (PSRAM). For example, the non-volatile memory may include at least one of a programmable ROM (PROM), an erasable PROM (EPROM), an electrically erasable PROM (EEPROM), a flash memory, a hard disk, compact disk, and an embedded multi-media card (eMMC).

In the memory 120 of the vehicle control apparatus 100 according to an example, one or more instructions (or commands) representing calculations and/or operations to be performed on data by the processor 110 may be stored. A set of one or more instructions may be referred to as a firmware, operating system, process, routine, sub-routine and/or application. For example, the vehicle control apparatus 100 and/or the processor 110 may perform at least one among operations of FIGS. 2, 4 and 8 when/if executing a set of a plurality of instructions distributed in the form of an operating system, firmware, driver, and/or application.

Hereinafter, installation of software in the form of an operating system, firmware, driver, and/or application in the vehicle control apparatus 100, which means that one or more instructions provided in the form of software are stored in the memory 120 of the vehicle control apparatus 100, may mean that one or more applications are stored in an executable format (e.g., a file with an extension specified by the operating system of the vehicle control apparatus 100) by the processor 110 of the vehicle control apparatus 100.

The vehicle control apparatus 100 according to an example may include a plurality of applications. The vehicle control apparatus 100 may establish a communication link for each of a plurality of applications by using different networks, depending on the location where each of the plurality of applications is included. For example, the plurality of applications may be referred to as a plurality of software applications.

For example, the vehicle control apparatus 100 may perform communication between a first application and a second application included in one host (e.g., a chip set). The vehicle control apparatus 100 may assign a shared memory area (e.g., a task area 550 in FIG. 5) to the first application and the second application in order to perform communication between the first application and the second application within the host. As an example, the vehicle control apparatus 100 may use an interface (e.g., an interface 310 in FIG. 3) for establishing a communication link between the first application and the second application to process data obtained by the first application and the second application. The first application and the second application may be included in the same network. The data may include queue data.

For example, the vehicle control apparatus 100 may establish a communication link between the first application and the second application included in different hosts. For example, the first application and the second application may be included in logically or physically different networks.

In order to perform communication between the first application and the second application, the vehicle control apparatus 100 according to an example may process data obtained based on the execution of the first application based on execution of the second application.

For example, if using the second application to process data obtained based on the first application, the vehicle control apparatus 100 may determine whether the second application is included outside the host that includes the first application.

The vehicle control apparatus 100 according to an example may obtain first data based on execution of the first application. For example, the vehicle control apparatus 100 may identify the second application related to the first data based on obtaining the first data.

The vehicle control apparatus 100 according to an example may determine whether to process the first data in the task area based on preset information. For example, if the second application is included outside the host that includes the first application, it may be determined not to process the first data in the task area. For example, if the second application is included within the host that includes the first application, it may be determined to process the first data in the task area.

For example, the vehicle control apparatus 100 may determine whether to process the first data in the task area depending on whether the communication scheme corresponding to the first application and the communication scheme corresponding to the second application are the same. If the communication scheme corresponding to the first application and the communication scheme corresponding to the second application are the same, the vehicle control apparatus 100 may process the first data in the task area. If the communication scheme corresponding to the first application is different from the communication scheme corresponding to the second application, the vehicle control apparatus 100 may process the first data in an area (e.g., a second application buffer) different from the task area. However, the example is not limited thereto.

For example, preset information may include one piece of information about data that is obtainable based on the execution of an application, information about an application related to data, information about a communication scheme between applications for processing data, or a combination thereof. The communication scheme may include information about whether applications are located within one host or whether each of the applications is included in different hosts. The communication scheme may differ depending on whether data is processed in a task area or whether data is processed in an application buffer.

The vehicle control apparatus 100 according to an example may identify the second application related to the first data based on obtaining the first data. The vehicle control apparatus 100 may identify the second application related to the first data based on preset information.

Based on identifying the second application, the vehicle control apparatus 100 according to an example may write (or store) the first data to the task area commonly assigned to the first application and the second application.

The vehicle control apparatus 100 according to an example may process the first data by using the second application accessible to the task area after writing the first data to the task area.

When/if processing the first data in the task area, the vehicle control apparatus 100 according to an example may assign the task area to the first application and the second application in common, and write, to the task area, the first data included in the first application buffer occupied by the first application.

For example, the vehicle control apparatus 100 may write data to the task area by using a runnable. For example, the runnable may include an interface used to generate a thread. The runnable may be used to define a task to be executed through a thread. The runnable may represent a unit in which logic for processing data is performed.

For example, the vehicle control apparatus 100 may stop copying the first data to the second application buffer occupied by the second application. For example, the vehicle control apparatus 100 may bypass moving the first data to the second application buffer and process the first data written in the task area.

When/if the first data is not processed in the task area, the vehicle control apparatus 100 according to an example may move the first data to the second application buffer. Moving the first data to the second application buffer may include moving the first data to the second application buffer by copying and/or pasting the first data. The first data moved to the second application buffer may be substantially the same as the first data included in the first application buffer and the task area. The vehicle control apparatus 100 may process the first data moved to the second application buffer.

As described above, the vehicle control apparatus 100 according to an example may process data by distinguishing communication schemes between applications. For example, the vehicle control apparatus 100 may assign a shared memory area to process data generated by applications located within the host. Based on processing data through a shared memory, the vehicle control apparatus 100 may improve data processing speed by reducing the time taken by data copying (e.g., copying data to an application buffer).

Figure 2:
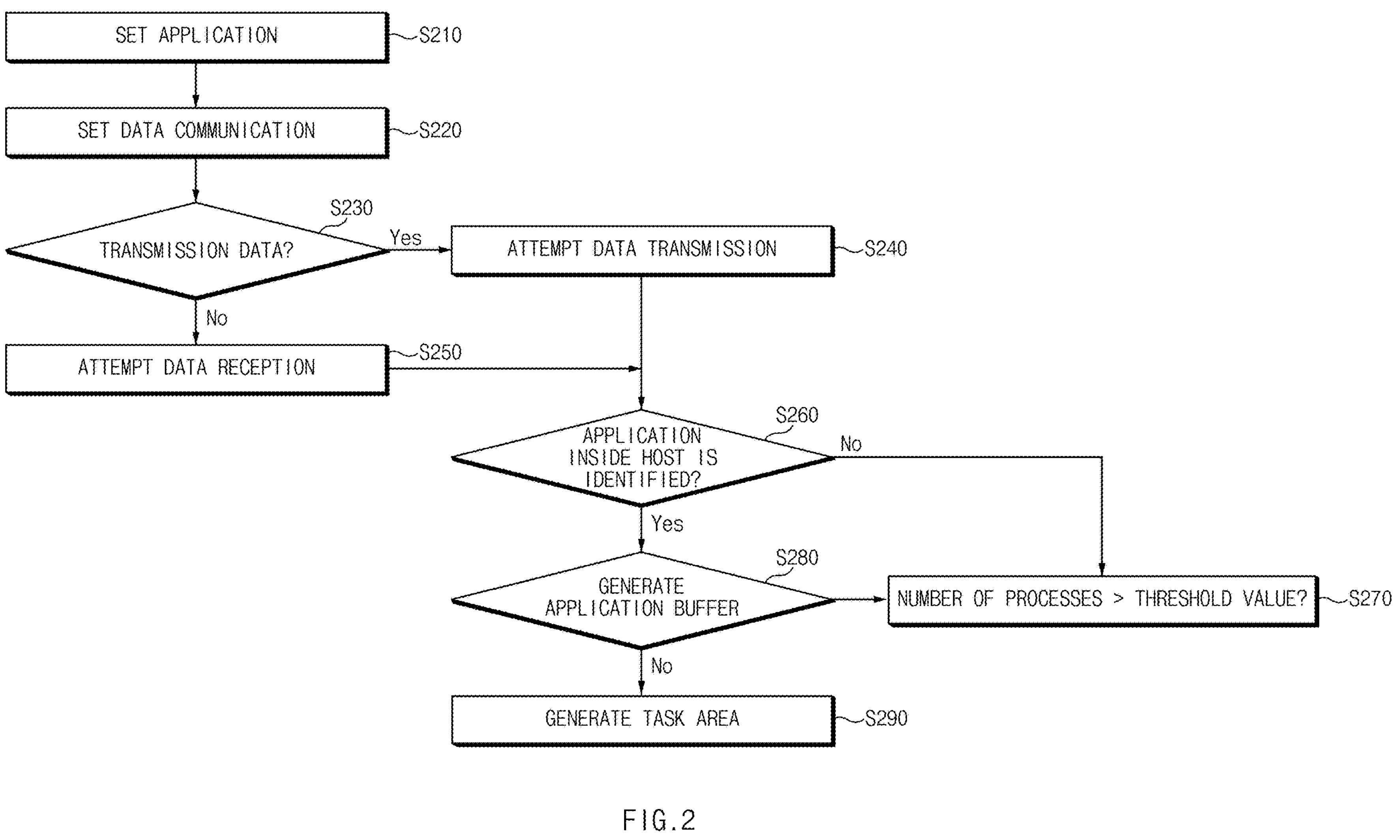
FIG. 2 shows an example flowchart showing an operation of a vehicle control apparatus according to an example of the present disclosure.

FIG. 2 shows an example flowchart showing the operation of a vehicle control apparatus according to an example of the present disclosure. Hereinafter, it is assumed that the vehicle control apparatus 100 of FIG. 1 may perform the process of FIG. 2. Additionally or alternatively, it may be understood in the description of FIG. 2 that operations described as being performed by an apparatus are controlled by the processor 110 of the vehicle control apparatus 100. Each of the operations in FIG. 2 may be performed sequentially, but is not necessarily performed sequentially. For example, the order of each operation may be changed, and at least two operations may be performed in parallel.

Referring to FIG. 2, in operation S210, the vehicle control apparatus according to an example may set an application. If setting an application, the vehicle control apparatus may determine transmission data to be transmitted to another application or reception data to be received from another application based on the execution of the application. For example, the vehicle control apparatus may determine another application to process the obtained data based on execution of the application.

Referring to FIG. 2, in operation S220, the vehicle control apparatus according to an example may establish data communication. For example, if the vehicle control apparatus communicates with another application outside the host of the application that generated data, data communication may be set to process data based on data copy using an application buffer. For example, if the vehicle control apparatus communicates with another application within the host of the application that generated data, data communication may be set up to process data based on a shared memory area (e.g., the task area 550 in FIG. 5).

Referring to FIG. 2, in operation S230, the vehicle control apparatus according to an example may determine whether data obtained based on execution of an application is transmission data. If the data is transmission data (operation S230—Yes), in operation S240, the vehicle control apparatus according to an example may attempt (or perform) data transmission to allow another application to process the transmission data. If the data is not transmission data (operation S230—No), in operation S250, the vehicle control apparatus according to an example may attempt (or perform) data reception to allow the application to process the reception data.

Referring to FIG. 2, in operation S260, the vehicle control apparatus according to an example may determine whether an application within the host is identified. For example, if performing operation S240, the vehicle control apparatus may determine whether another application that is distinct from the application that obtains the transmission data is located in the same host as the application. For example, if performing operation S250, the vehicle control apparatus may determine whether another application that is distinct from the application that may process the reception data is located in the same host as the application.

Referring to FIG. 2, if the application inside the host is identified (operation S260—Yes), in operation S280, the vehicle control apparatus according to an example may determine whether the number of processes to be processed using a shared memory area, commonly assigned to the application and another application, exceeds a threshold value (e.g. 5). For example, the vehicle control apparatus may perform operation S280 to reduce the processing time of the process. The example is not limited thereto.

Referring to FIG. 2, if the application inside the host is not identified (operation S260—No) or if the number of processes exceeds the threshold value (operation S280—Yes), in operation S270, the vehicle control apparatus according to an example may generate an application buffer. The vehicle control apparatus may process data by copying (or moving) data using the application buffer.

Referring to FIG. 2, if the number of processes is less than the threshold value (operation S280—No), in operation S290, the vehicle control apparatus according to an example may generate a shared memory area (e.g., a task area) for processing data.

For example, by generating a shared memory area (e.g., a task area), the vehicle control apparatus may process data by using the shared memory area (e.g., the task area) without having to move the data to an application buffer corresponding to the application to process the data.

For example, the vehicle control apparatus may set a lock on the shared memory area (e.g., the task area) to write data to the shared memory area (e.g., the task area) or read data from the shared memory area (e.g., the task area). The vehicle control apparatus may maintain the integrity of data to be processed using the shared memory area (e.g., the task area) by setting the lock setting for the shared memory area (e.g., the task area) to a default value. The example is not limited thereto. For example, the vehicle control apparatus may use a shared memory area (e.g., a task area) including a circular buffer instead of setting a lock on the shared memory area (e.g., the task area). For example, a circular buffer may comprise a data structure that may use a single, fixed-size buffer arranged in a continuous sequence. If the circular buffer is full, new data may overwrite the oldest data, maintaining a continuous flow. This structure may be useful in situations where data is produced and consumed at different rates, such as in streaming or real-time processing systems. The circular buffer may efficiently reuse memory without needing to shift data. Circular buffers may be useful for tasks, for example, such as buffering audio or network packets, etc., where data may be processed in a continuous stream.

Figure 3:
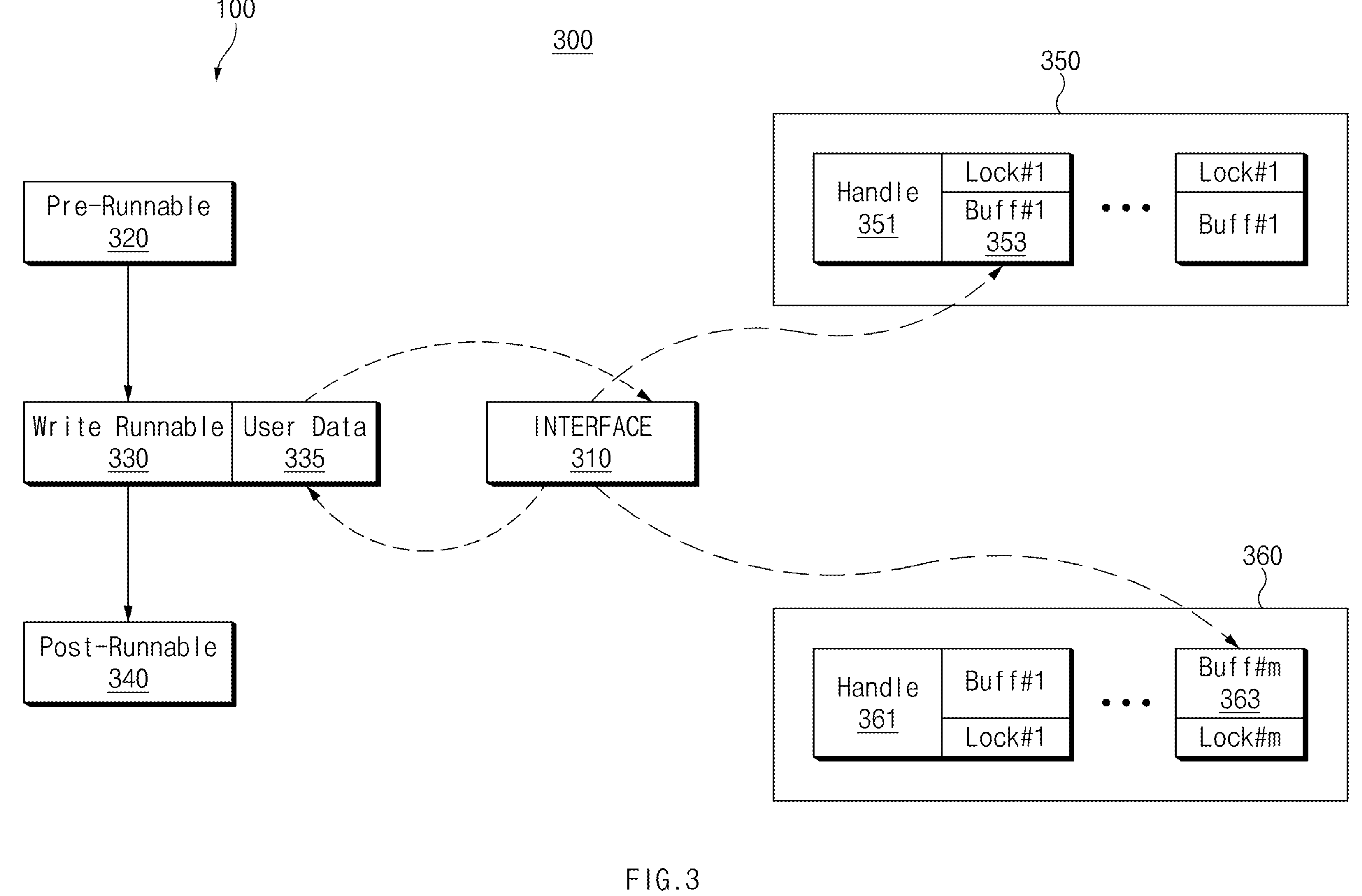
FIG. 3 shows an example diagram showing an operation of processing data by a vehicle control apparatus according to an example of the present disclosure.

FIG. 3 shows an example diagram showing an example 300 of an operation of processing data by a vehicle control apparatus according to an example of the present disclosure. The vehicle control apparatus 100 of FIG. 3 may be referenced to the vehicle control apparatus 100 of FIG. 1.

In the example 300, the vehicle control apparatus 100 may process the data obtained based on execution of an application by using a runnable.

For example, the vehicle control apparatus 100 may identify the interface 310 (e.g., a communication interface or a data interface) for performing data communication. For example, the vehicle control apparatus 100 may execute the interface 310 by using a memory area different from the memory area occupied by the application. Another memory area occupied by the interface 310 may include a task area (e.g., a shared memory area) commonly assigned to an application and another application that may communicate with the application. For example, the interface 310 may include an application programming interface (API). The example is not limited thereto.

For example, the vehicle control apparatus 100 may use a preprocessing runnable 320 to perform preprocessing on data to be obtained based on execution of an application. For example, the vehicle control apparatus may set a lock on a task buffer to which data may be written. For example, the vehicle control apparatus may set a lock on the read to write data. The example is not limited thereto. For example, if data is written in the task buffer, the vehicle control apparatus may set a lock on the write to read the data.

The vehicle control apparatus 100 according to an example may transmit first data to be processed to the interface 310 through a write runnable 330. For example, the vehicle control apparatus 100 may write the first data to a task area (e.g., a shared memory area) related to the interface 310. For example, the vehicle control apparatus 100 may move the first data stored in the memory area (e.g., an application buffer 335) occupied by the application to the task area (e.g., the shared memory area) occupied by the interface 310.

For example, the vehicle control apparatus 100 may identify the address of the buffer where the first data is stored by storing the first data in the task area (e.g., the shared memory area) using the interface 310. For example, information 350 related to the first data may include a handler area 351 (e.g., Handle 351 in FIG. 3) and an address 353 for the first buffer (e.g., Buff#1 353 in FIG. 3).

For example, a handler may comprise a function, method, or block of code that may be responsible for managing or responding to specific events, inputs, or actions within a system. If an event (e.g., a user clicking a button, an error being thrown, or data being received from a network, etc.) occurs, a corresponding handler may be triggered to process that event and/or execute the appropriate action. For example, handlers may be useful in event-driven programming, where they allow systems to respond dynamically to external interactions, ensuring that tasks are performed efficiently and in response to real-time stimuli. For example, a handle may comprise an abstract reference or identifier that may allow a program to indirectly access a resource (e.g., such as memory, a file, or a hardware device, etc.) without needing to manage the resource directly. For example, a handler may function as a pointer or ID provided by the system to represent a resource, enabling the program to perform operations such s reading, writing, and/or modifying the resource through the handle, while the underlying system manages the complexity of resource allocation and deallocation. Handles may simplify resource management by abstracting the details of the resource's location and/or state.

The handler area 351 may indicate the address of a buffer in which data may be most recently stored (e.g., the address 353 for the first buffer). The information 350 may represent input data.

After/if writing the first data, the vehicle control apparatus 100 according to an example may use a post-processing runnable 340 to free (or release) the lock on the first buffer.

For example, the vehicle control apparatus 100 may identify the address 353 where the first data is stored by using the information 350 and process the first data based on the execution of another application.

The vehicle control apparatus 100 according to an example may read (or process) second data included in the task area (e.g., the shared memory area) through the interface 310. For example, the vehicle control apparatus 100 may use information 360 about the second data to identify the address where the second data is stored (or written).

For example, the information 360 may represent output data. The information 360 may include an address 363 for a handler area 361 and/or the m-th buffer where the second data is stored.

For example, the handler area 361 may indicate the address 363 for the most recently stored m-th buffer. The vehicle control apparatus 100 may process the second data stored in the m-th buffer based on execution of an application for processing the second data.

As described above, the vehicle control apparatus 100 according to an example may process data through a task area (e.g., a shared memory area) assigned to an application that generates data through the interface 310 and another application to process the data. For example, the vehicle control apparatus may move data stored in the application buffer corresponding to the application that generates the data to the task area (e.g., the shared memory area). By moving data to the task area (e.g., the shared memory area), the vehicle control apparatus may store information (e.g., the information 350) indicating the location where the data is stored based on a pointer. The vehicle control apparatus 100 may use information indicating the location where the data is stored, and process the data in the task area (e.g., the shared memory area) based on the execution of another application to process the data without copying the data to another application buffer corresponding to another application. The vehicle control apparatus 100 may eliminate data copy logic that generates a load depending on the data size (e.g., queue data size) by not copying data to another application buffer.

Figure 4:
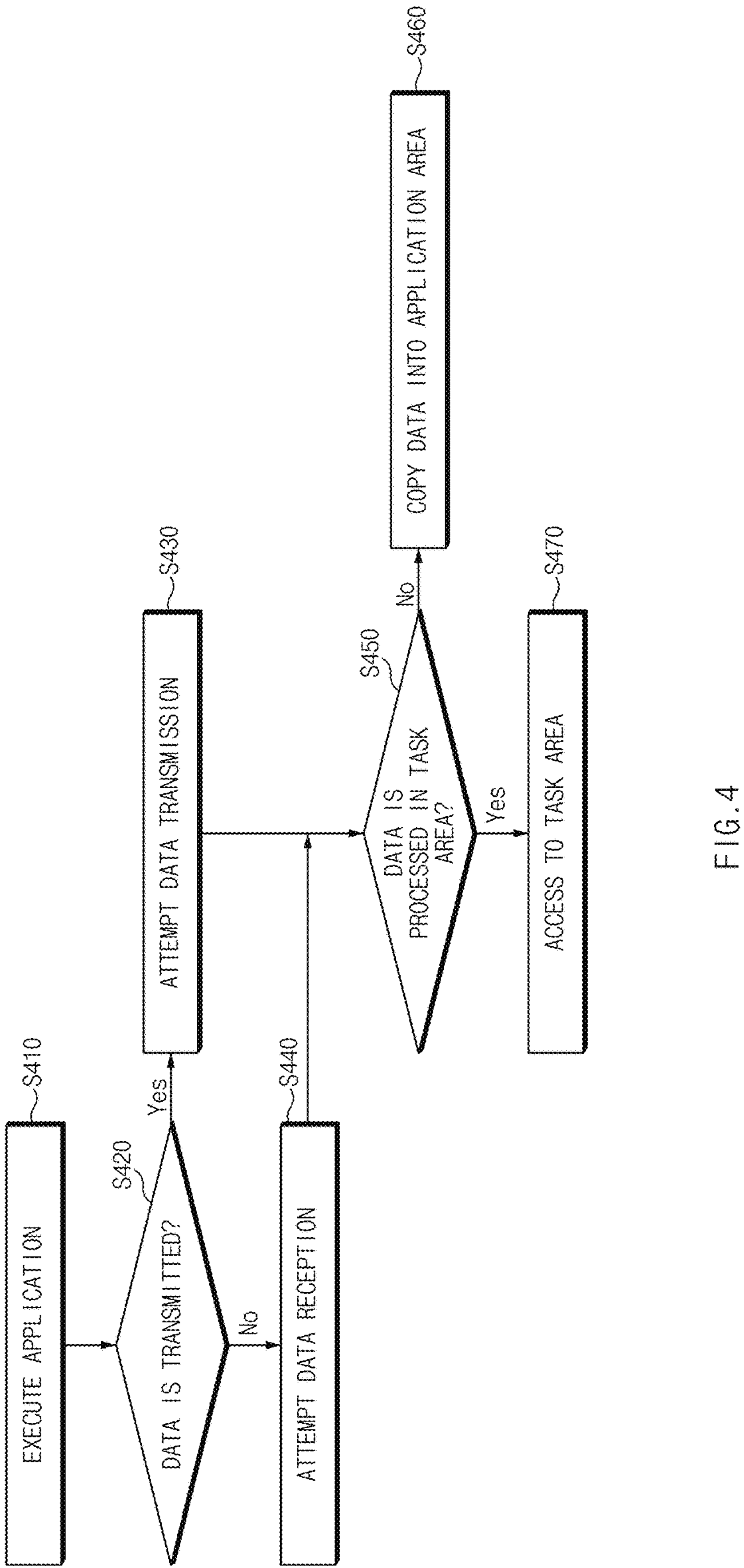
FIG. 4 shows an example flowchart showing the operation of a vehicle control apparatus according to an example of the present disclosure.

FIG. 4 shows an example flowchart showing the operation of a vehicle control apparatus according to an example of the present disclosure. Hereinafter, it is assumed that the vehicle control apparatus 100 of FIG. 1 performs the process of FIG. 4. Additionally or alternatively, it may be understood in the description of FIG. 4 that operations described as being performed by an apparatus may be controlled by the processor 110 of the vehicle control apparatus 100. Each of the operations in FIG. 4 may be performed sequentially, but is not necessarily performed sequentially. For example, the order of each operation may be changed, and at least two operations may be performed in parallel. At least one of the operations in FIG. 4 may be related to at least one of the operations in FIG. 2.

Referring to FIG. 4, in operation S410, the vehicle control apparatus according to an example may execute an application. The executed application may include an application set based on at least one of the operations in FIG. 2.

Referring to FIG. 4, in operation S420, it is possible to determine whether to transmit data obtained based on execution of an application. When/if transmitting data (operation S420—Yes), the vehicle control apparatus according to an example may attempt to transmit data in operation S430. If receiving data (operation S420—No), the vehicle control apparatus according to an example may attempt to receive data in operation S440.

For example, the vehicle control apparatus may identify another application related to data based on preset information. Based on identifying another application, the vehicle control apparatus may transmit or receive data through a task area (e.g., a shared memory area) commonly assigned to the application and another application.

Referring to FIG. 4, in operation S450, the vehicle control apparatus according to an example may determine whether to process data in the task area (e.g., the shared memory area). If an application and another application are included within one host, the vehicle control apparatus may determine to process data in the task area (e.g., the shared memory area). If another application is included outside the host that includes an application, the vehicle control apparatus may determine to process data in an application area (e.g., an application buffer) corresponding to another application.

Referring to FIG. 4, if data is not processed in a task area (operation S450—No), in operation S460, the vehicle control apparatus according to an example may copy the data to the application area corresponding to another application.

Referring to FIG. 4, if data is processed in a task area (operation S450—Yes), in operation S470, the vehicle control apparatus according to an example may access the task area based on execution of another application.

Figure 5:
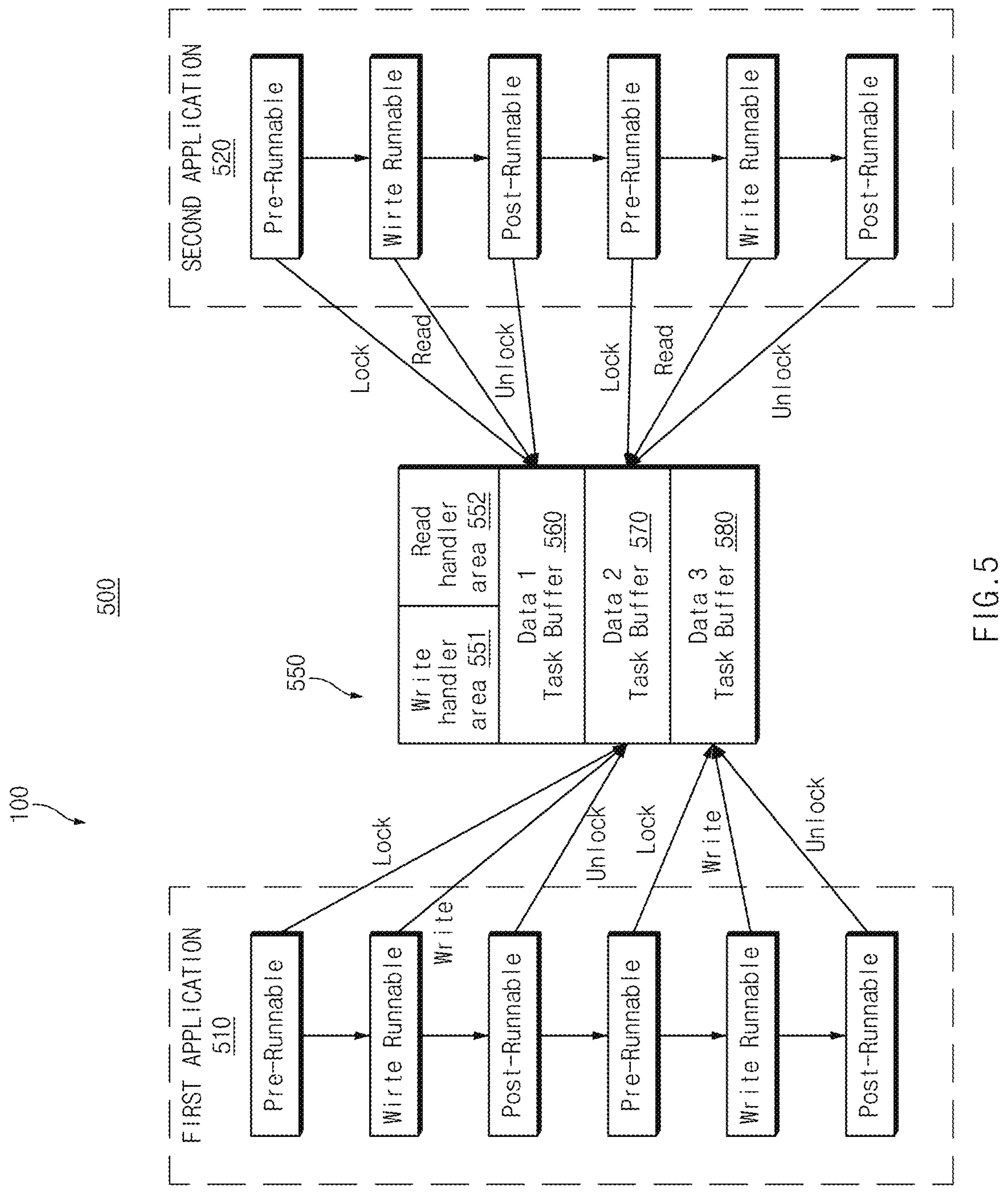
FIG. 5 shows an example diagram showing an operation of processing data using an application inside a host by a vehicle control apparatus according to an example of the present disclosure.

FIG. 5 shows an example diagram showing an example 500 of an operation of processing data using an application inside a host by a vehicle control apparatus according to an example of the present disclosure. The vehicle control apparatus 100 of FIG. 5 may be referenced to the vehicle control apparatus 100 of FIG. 1.

In the example 500, the vehicle control apparatus 100 may include a first application 510 and/or a second application 520. The first application 510 and/or the second application 520 may include an application set based on at least one of the operations shown in FIG. 2. For example, the first application 510 and the second application 520 may be included in one host (e.g., a chip set).

The vehicle control apparatus 100 according to an example may assign the task area 550 in common to the first application 510 and the second application 520 to perform communication between the first application 510 and the second application 520. For example, the task area 550 may include a plurality of task buffers 560, 570 and 580 (e.g., task buffer 560, task buffer 570, and/or task buffer 580 in FIG. 5).

The vehicle control apparatus 100 according to an example may obtain first data (e.g., Data 1 in FIG. 5) based on execution of the first application 510. The vehicle control apparatus 100 may write the first data (e.g., Data 1 in FIG. 5) to the first task buffer (e.g., task buffer 560 in FIG. 5) among the plurality of task buffers (e.g., task buffer 560, task buffer 570, and/or task buffer 580 in FIG. 5).

The vehicle control apparatus 100 according to an example may set a lock on one task area (e.g., task area 550 in FIG. 5) to prevent writing for one task area (e.g., task area 550 in FIG. 5) and reading for one task area (e.g., task area 550 in FIG. 5) from being performed simultaneously.

For example, the vehicle control apparatus 100 may set a lock on the first task buffer (e.g., task buffer 560 in FIG. 5), for example, before writing the first data (e.g., Data 1 in FIG. 5) to the first task buffer (e.g., task buffer 560 in FIG. 5), blocking access by the second application 520. The operation of blocking access by the second application 520 may include blocking a read operation through the first task buffer (e.g., task buffer 560 in FIG. 5) using the second application 520.

For example, after/if writing the first data (e.g., Data 1 in FIG. 5) to the first task buffer (e.g., task buffer 560 in FIG. 5), the vehicle control apparatus 100 may release (or free) the lock on the first task buffer (e.g., task buffer 560 in FIG. 5) (or set unlock on the first task buffer (e.g., task buffer 560 in FIG. 5)). If the lock on the first task buffer (e.g., task buffer 560 in FIG. 5) is released, the vehicle control apparatus 100 may use the second application 520 to process the first data (e.g., Data 1 in FIG. 5).

While using the second application 520 to process the first data (e.g., Data 1 in FIG. 5) in the first task buffer (e.g., task buffer 560 in FIG. 5), the vehicle control apparatus 100 according to an example may write the second data (e.g., Data 2 in FIG. 5) sequentially obtained based on execution of the first application 510 to the second task buffer 570.

For example, the task area 550 may include one or more handler areas 551 and 552 (e.g., handler area 551, handler area 552 in FIG. 5) for identifying the address of a task buffer (e.g., task buffer 560, task buffer 570, and/or task buffer 580 in FIG. 5) where data is stored. For example, the vehicle control apparatus 100 may store the address of the last written buffer in a write handler area (e.g., handler area 551 in FIG. 5). The vehicle control apparatus 100 may store the address of the last read buffer in a read handler area (e.g., handler area 552 in FIG. 5).

For example, the vehicle control apparatus 100 may store the address for the second task buffer (e.g., task butter 570 in FIG. 5) in the write handler area (e.g., handler area 551 in FIG. 5) based on writing the second data (e.g., Data 2 in FIG. 5) to the second task buffer (e.g., task buffer 570 in FIG. 5).

For example, while writing the second data (e.g., Data 2 in FIG. 5) to the second task buffer (e.g., task buffer 570), the vehicle control apparatus 100 may use the second application 520 to process (or read) the first data (e.g., Data 1 in FIG. 5) stored in the first task buffer (e.g., task buffer 560 in FIG. 5).

For example, the vehicle control apparatus 100 may process the first data (e.g., Data 1 in FIG. 5) by identifying the address of the first task buffer (e.g., task buffer 560) included in the write handler area (e.g., handler area 551).

For example, the vehicle control apparatus 100 may store the address of the first task buffer (e.g., task buffer 560 in FIG. 5) that processes the first data (e.g., Data 1 in FIG. 5) in the read handler area (e.g., handler area 552 in FIG. 5). The example is not limited thereto.

The vehicle control apparatus 100 according to an example may update address information included in the write handler area (e.g., handler area 551 in FIG. 5) and/or the read handler area (e.g., handler area 552 in FIG. 5).

For example, the vehicle control apparatus 100 may sequentially generate data (e.g., a plurality of image frames) for performing at least one function (e.g., in the case of a camera application, obtaining the plurality of image frames) based on execution of the first application 510. For example, in the case of a camera application, the vehicle control apparatus 100 may sequentially generate data such as a series of image frames that may be captured, for example, by an onboard camera of the vehicle control apparatus 100. These image frames may be used to perform at least one function, for example, such as detecting nearby obstacles, identifying lane markings for lane-keeping assistance, or recognizing traffic signs, etc. For example, while/if the vehicle is driving, the camera application may continuously capture and/or process image frames.

Additionally or alternatively, the vehicle control apparatus 100 may sequentially generate data by using LiDAR (Light Detection and Ranging). For example, LiDAR may comprise a sensor that may measure distances by emitting laser pulses and analyzing the time it takes for the reflected light to return to the sensor. LiDAR may collect spatial information, for example, by scanning the environment and providing data on the position, shape, and distance of objects. This data may complement the visual information captured by the camera application. If combined with the camera's image data through a process (e.g., Sensor Fusion), LiDAR may create a more accurate and/or detailed understanding of the surroundings. For example, while the camera application provides visual images of the road, LiDAR may determine how far away objects (e.g., vehicles, pedestrians, or obstacles) are, allowing the vehicle control apparatus 100 to make real-time decisions about navigation or obstacle avoidance.

Sensor Fusion may comprise a technology that may combine data from multiple sensors to produce more accurate, reliable, and/or comprehensive information than what may be obtained from a single sensor. By integrating data from various sources, such as cameras, LiDAR, radar, etc., Sensor Fusion may enable a vehicle (e.g., the vehicle control apparatus 100) to understand its environment. Sensor Fusion may be useful in fields such as autonomous driving, robotics, drones, etc. For example, in autonomous vehicle, Sensor Fusion may combine visual data from cameras with distance measurements from LiDAR, enabling the autonomous vehicle to better detect objects, measure distances, and make safer driving decisions.

For example, data may be collected from two devices (e.g., a camera and LiDAR), and the data may be combined through Sensor Fusion. The camera may capture frame-by-frame data, with each frame representing a single image or a short period of captured data, and may store it in two buffers: Buffer 1 (read-only) and Buffer 2 (write-only). The Camera Runnable may write data to Buffer 2 and may lock it in the Pre-Runnable phase to prevent other processes from altering the data. If the data is written, the lock may be released in the Post-Runnable phase. Sensor Fusion may read data from Buffer 1 and may combine it with LiDAR data. This process may align the camera and LiDAR data based on time to calculate accurate spatial information, such as the position of objects. While the camera writes new frame data to Buffer 2, Sensor Fusion simultaneously may read and process the previous frame from Buffer 1. For example, as the camera captures real-time images of a road and stores them in Buffer 2, Sensor Fusion may read the data from Buffer 1, combine it with LiDAR data, and calculate the position and distance of objects on the road.

For example, after/if writing the second data (e.g., Data 2 in FIG. 5) to the second task buffer (e.g., task buffer 570 in FIG. 5), the vehicle control apparatus 100 may obtain the third data (e.g., Data 3 in FIG. 5), for example, based on execution of the first application 510. The vehicle control apparatus 100 may write the third data (e.g., Data 3 in FIG. 5) to the third task buffer (e.g., third task buffer 580 in FIG. 5). The vehicle control apparatus 100 may update the write handler area (e.g., handler area 551 in FIG. 5), for example, by using the address for the third task buffer (e.g., third task buffer 580 in FIG. 5). The vehicle control apparatus 100 may use the updated write handler area (e.g., handler area 551) to identify the address of the third task buffer (e.g., third task buffer 580) among the addresses of the second and third task buffers (e.g., the second buffer 570 and the third task buffer 580). The vehicle control apparatus 100 may process the third data (e.g., Data 3 in FIG. 5) included in the third task buffer (e.g., third task buffer 580), for example, by using the second application 520, based on identifying the address of the third task buffer (e.g., third task buffer 580).

As described above, the vehicle control apparatus 100 according to an example may maintain the integrity of data stored in the buffer by distinguishing between a buffer for performing writing and a buffer for performing reading.

Figure 6:
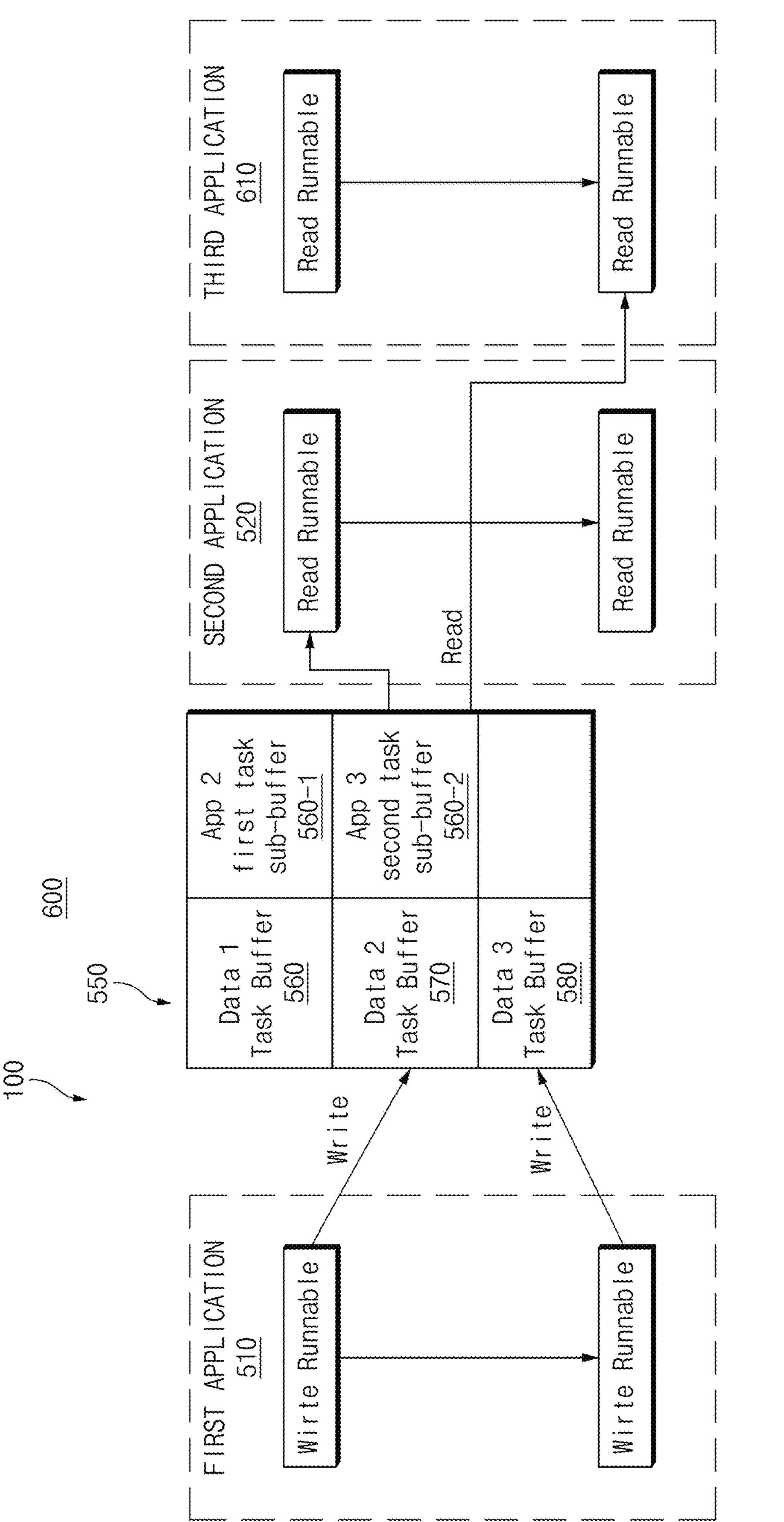
FIG. 6 shows an example diagram showing an operation of storing information about an application that processes data by a vehicle control apparatus according to an example of the present disclosure.

FIG. 6 shows an example diagram showing an example 600 of an operation of storing information about an application that processes data by a vehicle control apparatus according to an example of the present disclosure. The vehicle control apparatus 100 of FIG. 6 may be referenced to the vehicle control apparatus 100 of FIG. 1.

In the example 600, the first application 510, the second application 520, and/or a third application 610 may be included in the same host. If the first application 510, the second application 520, and/or the third application 610 are included in the same host, the vehicle control apparatus 100 may assign a memory area (e.g., the task area 550) that is shared to perform data communication between the first application 510, the second application 520 and/or the third application 610.

The vehicle control apparatus 100 according to an example may write (or store) the data sequentially obtained based on execution of the first application 510 to each of the plurality of task buffers 560, 570 and 580 in the task area 550 assigned together with the second application 520 and the third application 610.

For example, after processing the first data using the second application 520, the vehicle control apparatus 100 may write (or store) information about the second application 520 that processes the first data (e.g., Data 1 in FIG. 6) to the first task buffer 560 (or a first task sub-buffer 560-1).

For example, if processing the second data (e.g., Data 2 in FIG. 6) using the third application 610, the vehicle control apparatus 100 may write information about the third application 610 that processes the second data to the second task buffer (or a second task sub-buffer 560-2). The example is not limited thereto.

As described above, the vehicle control apparatus 100 according to an example may store information (or an index of a runnable) about the application (or a runnable called based on execution of the application) that processes data (or read data). The vehicle control apparatus 100 may perform debugging on data communication by using stored information. The vehicle control apparatus 100 may release data communication by identifying that performance of at least one function ends by using the stored information. For example, the vehicle control apparatus 100 may release the task area 550 by releasing data communication.

Figure 7:
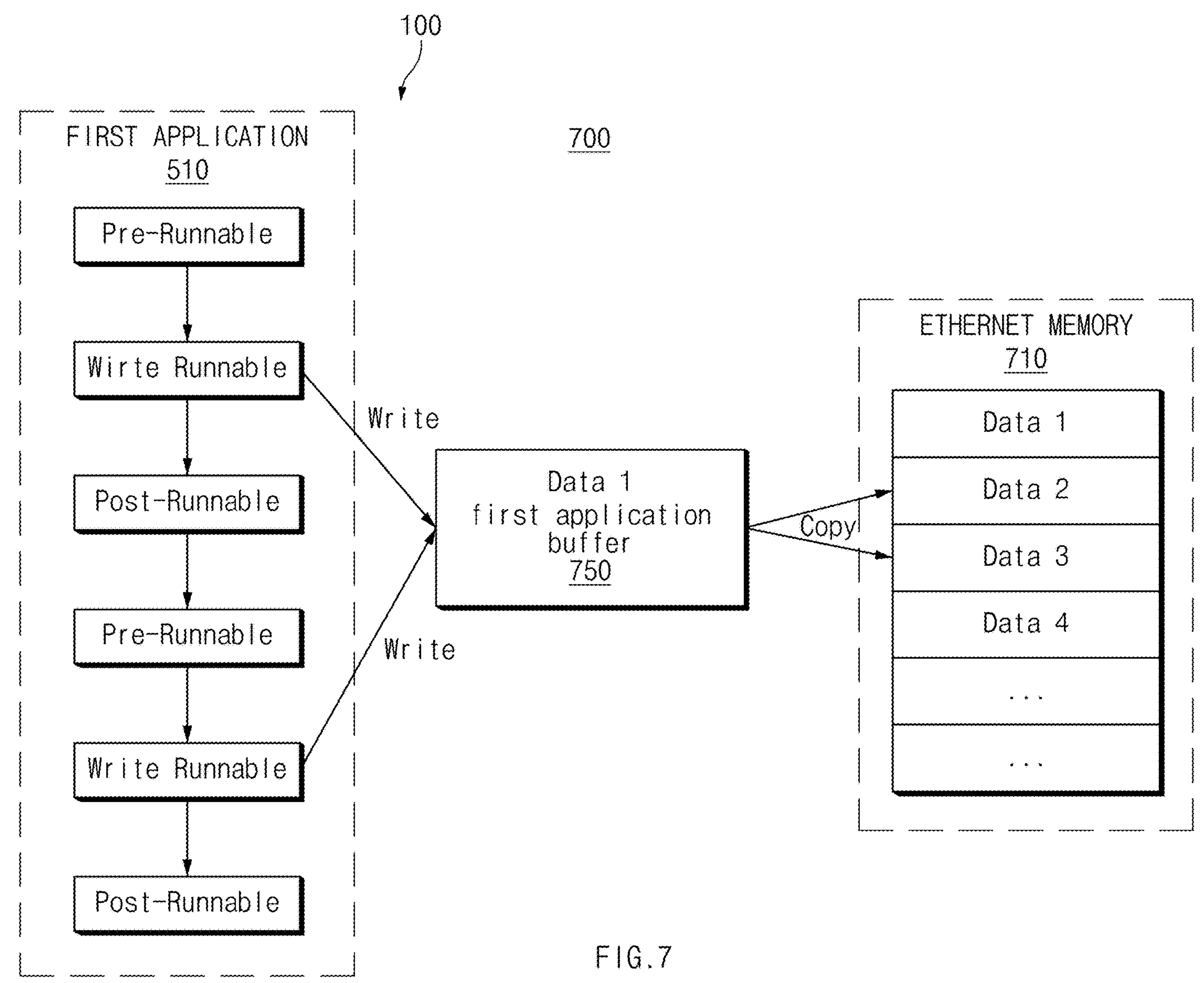
FIG. 7 shows an example diagram showing an operation of transmitting data to an application located outside a host by a vehicle control apparatus according to an example of the present disclosure.

FIG. 7 shows an example diagram showing an example 700 of an operation of transmitting data to an application located outside a host by a vehicle control apparatus according to an example of the present disclosure. The vehicle control apparatus 100 of FIG. 7 may be referenced to the vehicle control apparatus 100 of FIG. 1.

In the example 700, the vehicle control apparatus 100 may obtain the first data (e.g., Data 1 in FIG. 7) based on execution of the first application 510. The first data (e.g., Data 1 in FIG. 7) may be stored in a first application buffer 750 corresponding to the first application 510. The first data (e.g., Data 1 in FIG. 7) may be processed by the second application (not shown in FIG. 7) included in an external host that is physically or logically separated from the host corresponding to the first application 510. The second application (not shown in FIG. 7) may be referred to as an external host application.

The vehicle control apparatus 100 according to an example may store the first data (e.g., Data 1 in FIG. 7) stored in the first application buffer 750 in an Ethernet memory 710 assigned by an Ethernet interface for communicating with an external host. The Ethernet memory 710 may include a plurality of buffers. The vehicle control apparatus 100 may write (or copy) data sequentially generated based on execution of the first application 510 to each of a plurality of buffers.

For example, the vehicle control apparatus 100 may transmit the data stored in the Ethernet memory 710 to an external host including the second application (not shown in FIG. 7) to process the data by using Ethernet (or a network service for communicating with an external host).

For example, the vehicle control apparatus 100 may request Ethernet transmission together with buffer transfer to transmit data over Ethernet. If transmission is possible in an Ethernet layer, the vehicle control apparatus 100 may copy the delivered buffer data to a socket buffer and transmit it as an Ethernet packet.

Figure 8:
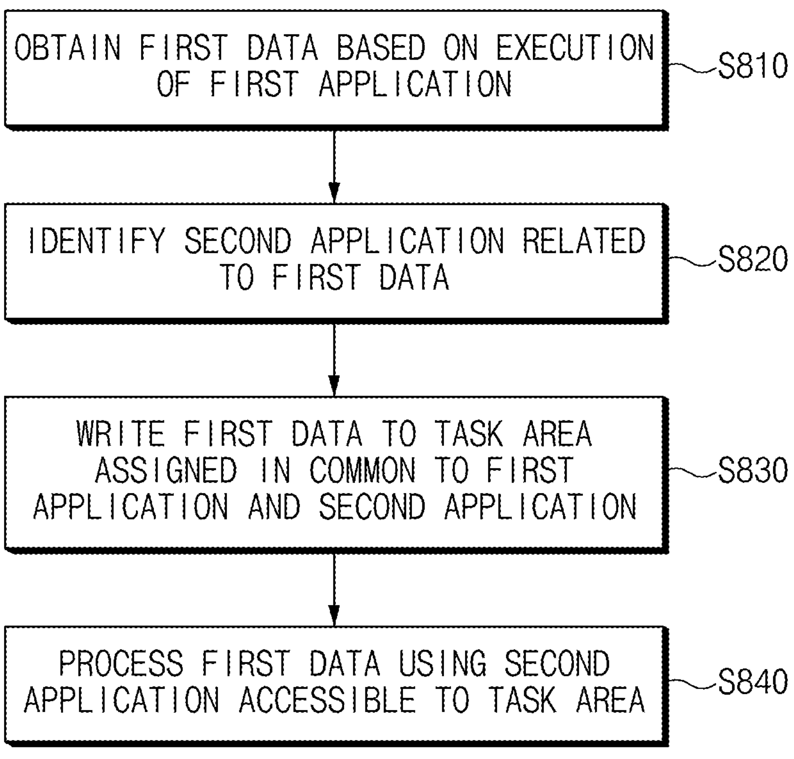
FIG. 8 shows an example flowchart showing a method of controlling a vehicle according to an example of the present disclosure.

FIG. 8 shows an example flowchart showing a method of controlling a vehicle according to an example of the present disclosure. Hereinafter, it is assumed that the vehicle control apparatus 100 of FIG. 1 performs the process of FIG. 8. Additionally or alternatively, it may be understood in the description of FIG. 8 that operations described as being performed by an apparatus are controlled by the processor 110 of the vehicle control apparatus 100. Each of the operations in FIG. 8 may be performed sequentially, but is not necessarily performed sequentially. For example, the order of each operation may be changed, and at least two operations may be performed in parallel.

Referring to FIG. 8, a method of controlling a vehicle according to an example may include an operation of obtaining first data based on execution of a first application in operation S810. The method of controlling a vehicle may include an operation of sequentially obtaining data to perform at least one function by using the first application.

Referring to FIG. 8, the method of controlling a vehicle according to an example may include an operation of identifying a second application related to the first data in operation S820. For example, the method of controlling a vehicle may include an operation of identifying a second application based on preset information when/if setting a communication scheme (e.g., operation S220 in FIG. 2) for the first data based on at least one of the operations in FIG. 2.

Referring to FIG. 8, the method of controlling a vehicle according to an example may include an operation of writing the first data to a task area commonly assigned to the first application and the second application in operation S830. The method of controlling a vehicle may include an operation of setting a lock on the task area before writing the first data. The method of controlling a vehicle may include an operation of releasing the lock on the task area after writing the first data.

Referring to FIG. 8, the method of controlling a vehicle according to an example may include an operation of processing the first data by using the second application accessible to the task area in operation S840.

For example, the method of controlling a vehicle may include an operation of controlling a function of a vehicle based on processing the first data.

For example, the method of controlling a vehicle may include an operation of processing the first data in the task area if the first application and the second application are included in the same host.

For example, the method of controlling a vehicle may include an operation of processing the first data stored in the task area by moving (or copying) the first data to the application buffer corresponding to the second application if the first application and the second application are included in logically or physically separate hosts, respectively.

According to an aspect of the present disclosure, an apparatus (e.g., for controlling a vehicle or any other devices) includes a processor and a memory. The processor obtains first data based on execution of a first application, identifies a second application related to the first data based on obtaining the first data, writes the first data to a task area commonly assigned to the first application and the second application based on identifying the second application, and processes the first data by using the second application accessible to the task area after writing the first data to the task area.

According to an example, the processor may determine whether to process the first data in the task area based on preset information, assign the task area to the first application and the second application in common when processing the first data in the task area, write the first data included in a first application buffer occupied by the first application to the task area, and stop copying the written first data to a second application buffer occupied by the second application.

According to an example, the processor may move the first data to the second application buffer when the first data is not processed in the task area based on the preset information, and process the first data moved to the second application buffer by using the second application.

According to an example, the processor may determine whether to process the first data in the task area according to whether a communication scheme corresponding to the first application and a communication scheme corresponding to the second application are same.

According to an example, the preset information may include at least one piece of information about data that is obtainable based on execution of the first application, information about the second application related to the data, information about a communication scheme between the first application for processing the data and the second application, or a combination thereof.

According to an example, the task area may include a plurality of task buffers, wherein the processor may write the first data to a first task buffer among the plurality of task buffers, and write second data sequentially obtained based on execution of the first application to a second task buffer while processing the first data in the first task buffer by using the second application.

According to an example, the processor may block access of the second application to the first task buffer by setting a lock on the first task buffer before writing the first data to the first task buffer, and release the lock on the first task buffer after writing the first data to the first task buffer.

According to an example, the processor may write information about the second application that processed the first data to the first task buffer after processing the first data.

According to an example, the processor may process the first data by identifying an address of the first task buffer.

According to an example, the processor may identify an address of the second task buffer among the address of the first task buffer and the address of the second task buffer after writing the second data to the second task buffer.

According to an aspect of the present disclosure, a method of controlling a vehicle includes obtaining first data based on execution of a first application, identifying a second application related to the first data based on obtaining the first data, writing the first data to a task area commonly assigned to the first application and the second application based on identifying the second application, and processing the first data by using the second application accessible to the task area after writing the first data to the task area.

According to an example, the processing of the first data may include determining whether to process the first data in the task area based on preset information, assigning the task area to the first application and the second application in common when processing the first data in the task area, writing the first data included in a first application buffer occupied by the first application to the task area, and stopping copying the written first data to a second application buffer occupied by the second application.

According to an example, the processing of the first data may further include moving the first data to the second application buffer when the first data is not processed in the task area based on the preset information, and processing the first data moved to the second application buffer by using the second application.

According to an example, the determining of whether to process the first data may include determining whether to process the first data in the task area according to whether a communication scheme corresponding to the first application and a communication scheme corresponding to the second application are same.

According to an example, the preset information may include at least one piece of information about data that is obtainable based on execution of the first application, information about the second application related to the data, information about a communication scheme between the first application for processing the data and the second application, or a combination thereof.

According to an example, the task area may include a plurality of task buffers, wherein the processing of the first data may include writing the first data to a first task buffer among the plurality of task buffers, and writing second data sequentially obtained based on execution of the first application to a second task buffer while processing the first data in the first task buffer by using the second application.

According to an example, the writing of the first data to the first task buffer may include blocking access of the second application to the first task buffer by setting a lock on the first task buffer before writing the first data to the first task buffer, and releasing the lock on the first task buffer after writing the first data to the first task buffer.

According to an example, the writing of the first data to the first task buffer may include writing information about the second application that processed the first data to the first task buffer after processing the first data.

According to an example, the processing of the first data may include processing the first data by identifying an address of the first task buffer.

According to an example, the writing to the second task buffer may include identifying an address of the second task buffer among the address of the first task buffer and the address of the second task buffer after writing the second data to the second task buffer.

Figure 9:
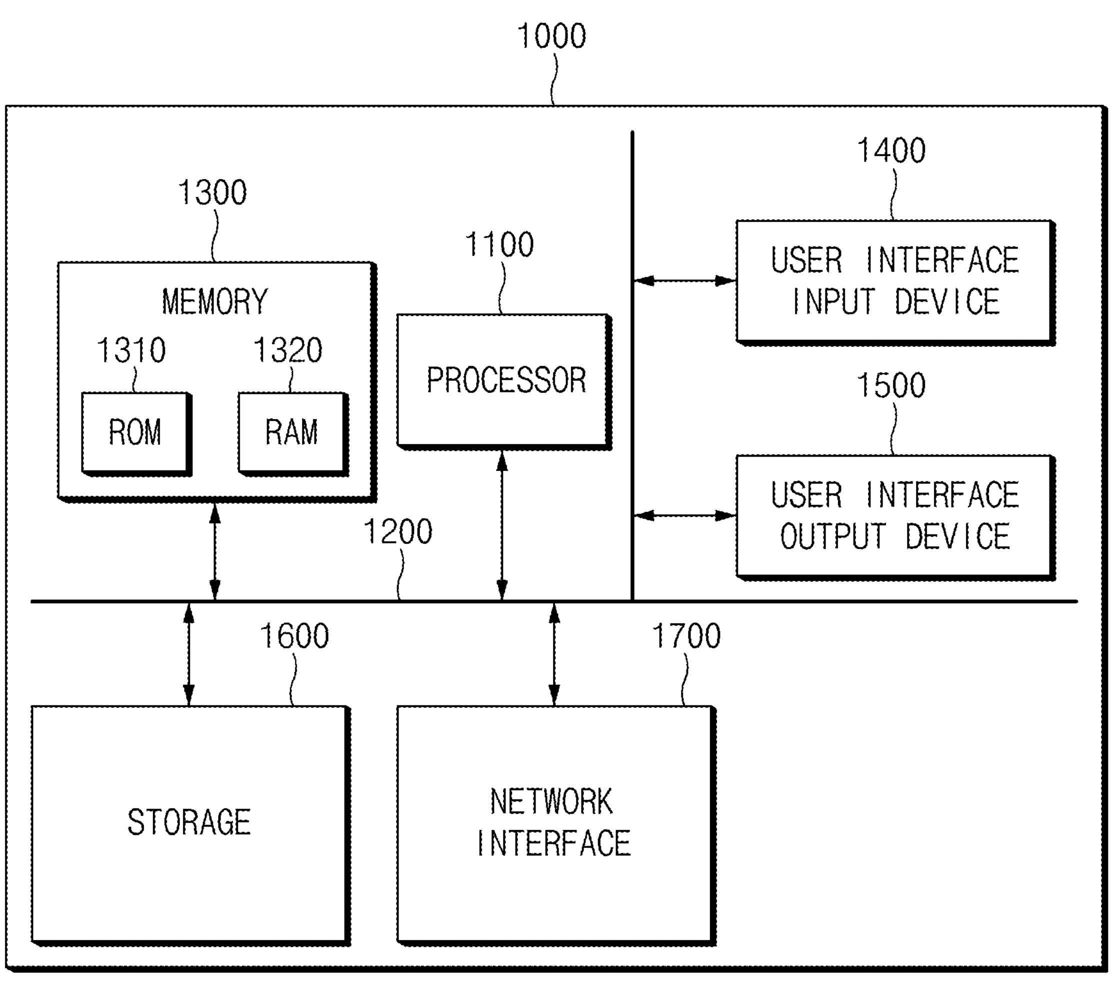
FIG. 9 shows an example block diagram showing a computing system related to a vehicle control apparatus or a method of controlling a vehicle according to an example of the present disclosure.

FIG. 9 shows an example block diagram showing a computing system related to the vehicle control apparatus or a method of controlling a vehicle according to an example of the present disclosure.

Referring to FIG. 9, the computing system 1000 may include at least one processor 1100, a memory 1300, a user interface input device 1400, a user interface output device 1500, storage 1600, and a network interface 1700 connected through a system bus 1200.

The processor 1100 may be a central processing device (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

The operations of the method or the algorithm described in connection with the examples disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present technology may maintain data integrity.

The present technology may provide data communication between applications within a host.

Additionally or alternatively, the present technology may reduce data processing time by generating a memory area to be shared between applications.

Additionally or alternatively, various effects that are directly or indirectly understood through the present disclosure may be provided.

Although exemplary examples of the present disclosure have been described for illustrative purposes, those skilled in the art will appreciate that various modifications, additions and substitutions are possible, without departing from the scope and spirit of the disclosure.

The exemplary examples disclosed in the present disclosure are provided for the sake of descriptions, not limiting the technical concepts of the present disclosure, and it should be understood that such exemplary examples are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus comprising:
- a processor; and
- a memory,
- wherein the processor is configured to:
  - obtain, based on execution of a first application, first data;
  - identify, based on obtaining the first data, a second application related to the first data;
  - write, based on identifying the second application, the first data to a shared task area of the memory, the shared task area being assigned to the first application and the second application and the first data included in a first application buffer occupied by the first application;
  - determine, based on preset information, whether to process the first data written in the shared task area; and
  - in response to determining to process the first data, process the first data by using the second application accessible to the shared task area,
- wherein the processor is further configured to:
  - maintain the shared task area commonly assigned to the first application and the second application during processing of the first data in the shared task area; and
  - prevent the first data being copied to a second application buffer occupied by the second application.

2. The apparatus of claim 1, wherein the processor is configured to:
- based on the preset information, move the first data to the second application buffer during the first data not being processed in the shared task area; and
- process the first data moved to the second application buffer by using the second application.

3. The apparatus of claim 1, wherein the processor is configured to:
- based on whether a communication scheme corresponding to the first application and a communication scheme corresponding to the second application are same, determine whether to process the first data in the shared task area.

4. The apparatus of claim 1, wherein the preset information comprises at least one of:
- information about data that is obtainable based on execution of the first application,
- information about the second application related to the data, or
- information about a communication scheme between the first application for processing the data and the second application.

5. The apparatus of claim 1, wherein the shared task area comprises a plurality of task buffers, and
- wherein the processor is configured to:
  - write the first data to a first task buffer of the plurality of task buffers; and
  - write, to a second task buffer of the plurality of task buffers, second data sequentially obtained based on execution of the first application while processing the first data in the first task buffer by using the second application.

6. The apparatus of claim 5, wherein the processor is configured to:
- block access of the second application to the first task buffer by setting a lock on the first task buffer before writing the first data to the first task buffer; and
- release the lock on the first task buffer after writing the first data to the first task buffer.

7. The apparatus of claim 5, wherein the processor is configured to write information about the second application that processed the first data to the first task buffer after the processing of the first data by the second application.

8. The apparatus of claim 5, wherein the processor is configured to process the first data by identifying an address of the first task buffer.

9. The apparatus of claim 8, wherein the processor is configured to identify an address of the second task buffer among the address of the first task buffer and the address of the second task buffer after writing the second data to the second task buffer.

10. A method performed by a computing device, the method comprising:

obtaining, based on execution of a first application, first data;

identifying, based on the obtaining the first data, a second application related to the first data;

writing, based on the identifying the second application, the first data to a shared task area, of a memory, the shared task area being assigned to the first application and the second application and the first data included in a first application buffer occupied by the first application;

determining, based on preset information, whether to process the first data in the shared task area by using the second application accessible to the shared task area; and processing the first data, wherein the processing of the first data further comprises:

maintaining the shared task area commonly assigned to the first application and the second application during processing of the first data in the shared task area; and preventing the first data being copied to a second application buffer occupied by the second application.

11. The method of claim 10, wherein the processing of the first data further comprises:

based on the preset information, moving the first data to the second application buffer during the first data not being processed in the shared task area; and processing the first data moved to the second application buffer by using the second application.

12. The method of claim 10, wherein the determining whether to process the first data comprises:

based on whether a communication scheme corresponding to the first application and a communication scheme corresponding to the second application are same, determining whether to process the first data in the shared task area.

13. The method of claim 10, wherein the preset information comprises at least one of:

information about data that is obtainable based on execution of the first application, information about the second application related to the data, or information about a communication scheme between the first application for processing the data and the second application.

14. The method of claim 10, wherein the shared task area comprises a plurality of task buffers, and wherein the processing of the first data comprises:

writing the first data to a first task buffer of the plurality of task buffers; and writing, to a second task buffer of the plurality of task buffers, second data sequentially obtained based on execution of the first application while processing the first data in the first task buffer by using the second application.

15. The method of claim 14, wherein the writing of the first data to the first task buffer comprises:

blocking access of the second application to the first task buffer by setting a lock on the first task buffer before writing the first data to the first task buffer; and releasing the lock on the first task buffer after writing the first data to the first task buffer.

16. The method of claim 14, wherein the writing of the first data to the first task buffer comprises writing information about the second application that processed the first data to the first task buffer after the processing of the first data by the second application.

17. The method of claim 14, wherein the processing of the first data comprises processing the first data by identifying an address of the first task buffer.

18. The method of claim 17, wherein the writing to the second task buffer comprises identifying an address of the second task buffer among the address of the first task buffer and the address of the second task buffer after writing the second data to the second task buffer.

19. An apparatus comprising:

a processor; and a memory, wherein the processor is configured to:

identify, based on first data associated with execution of a first application, a second application related to the first data;

write, based on identifying the second application, the first data to a shared task area of the memory, the first data being included in a first application buffer occupied by the first application, and the shared task area being assigned to the first application and the second application;

determine, based on preset information, whether to process the first data in the shared task area;

process the first data by using the second application accessible to the shared task area and maintain the shared task area commonly assigned to the first application and the second application during processing of the first data in the shared task area; and prevent the first data being copied to an application buffer occupied by the second application.

20. The apparatus of claim 19, wherein the preset information comprises at least one of:

information about data that is obtainable based on execution of the first application, information about the second application related to the data, or information about a communication scheme between the first application for processing the data and the second application.

* * * * *